United States Patent [19]
Bellamy et al.

[11] Patent Number: 5,741,001
[45] Date of Patent: Apr. 21, 1998

[54] HYDRAULIC ANTIVIBRATION SUPPORTS

[75] Inventors: Alain Bellamy, Naveil; Denis Reh; Pascal Petit, both of Chateaudun, all of France

[73] Assignee: Hutchinson, Paris, France

[21] Appl. No.: 548,547

[22] Filed: Oct. 26, 1995

[30] Foreign Application Priority Data

Oct. 27, 1994 [FR] France .................. 94 12889

[51] Int. Cl.$^6$ .................................. F16M 13/00
[52] U.S. Cl. .................. 248/634; 248/636; 248/638; 267/140.12
[58] Field of Search .................. 248/562, 619, 248/621, 632, 634, 580; 267/140.11, 140.12, 140.13, 140.5

[56] References Cited

U.S. PATENT DOCUMENTS

| | | | |
|---|---|---|---|
| 3,698,703 | 10/1972 | Hipsher | 248/562 X |
| 4,262,886 | 4/1981 | Salver et al. | |
| 4,492,366 | 1/1985 | Ozawa et al. | 248/562 X |
| 4,757,982 | 7/1988 | Andra et al. | 248/562 X |
| 4,767,106 | 8/1988 | Fol | |
| 4,861,005 | 8/1989 | Bausch | 248/562 X |

FOREIGN PATENT DOCUMENTS

| | | |
|---|---|---|
| 0172700 | 8/1985 | European Pat. Off. |
| 0646735 | 8/1994 | European Pat. Off. |
| 6-264965 | 9/1994 | Japan ................ 248/637 |
| 2200190 | 12/1987 | United Kingdom |
| 2207214 | 6/1988 | United Kingdom |
| 2211580 | 7/1989 | United Kingdom |

OTHER PUBLICATIONS

Patent Abstracts of Japan, 1-220737 (A), Appln. No. 63-43927, vol. 13, No. 538, Nov. 30, 1989.

Patent Abstracts of Japan, 1-220736 (A), Appln. No. 63-43801, vol. 13, No. 538, Nov. 30, 1989.

Patent abstract of Japan, vol. 8 No. 140 (M-305) (1577), Jun. 29, 1984.

Primary Examiner—Ramon O. Ramirez
Assistant Examiner—Long Dinh Phan
Attorney, Agent, or Firm—Larson and Taylor

[57] ABSTRACT

A hydraulic antivibration support comprises first and second rigid strength members, an elastomer body which has a thick wall interconnecting the two rigid strength members and which defines a portion of a working chamber, and a thin wall of elastomer which defines a portion of a compensation chamber that is connected to the working chamber via a narrow channel, the two chambers and the narrow channel being filled with a liquid. The support includes an abutment having no portion that projects into the working chamber from the inside surface of the thick wall of the elastomer body.

3 Claims, 2 Drawing Sheets

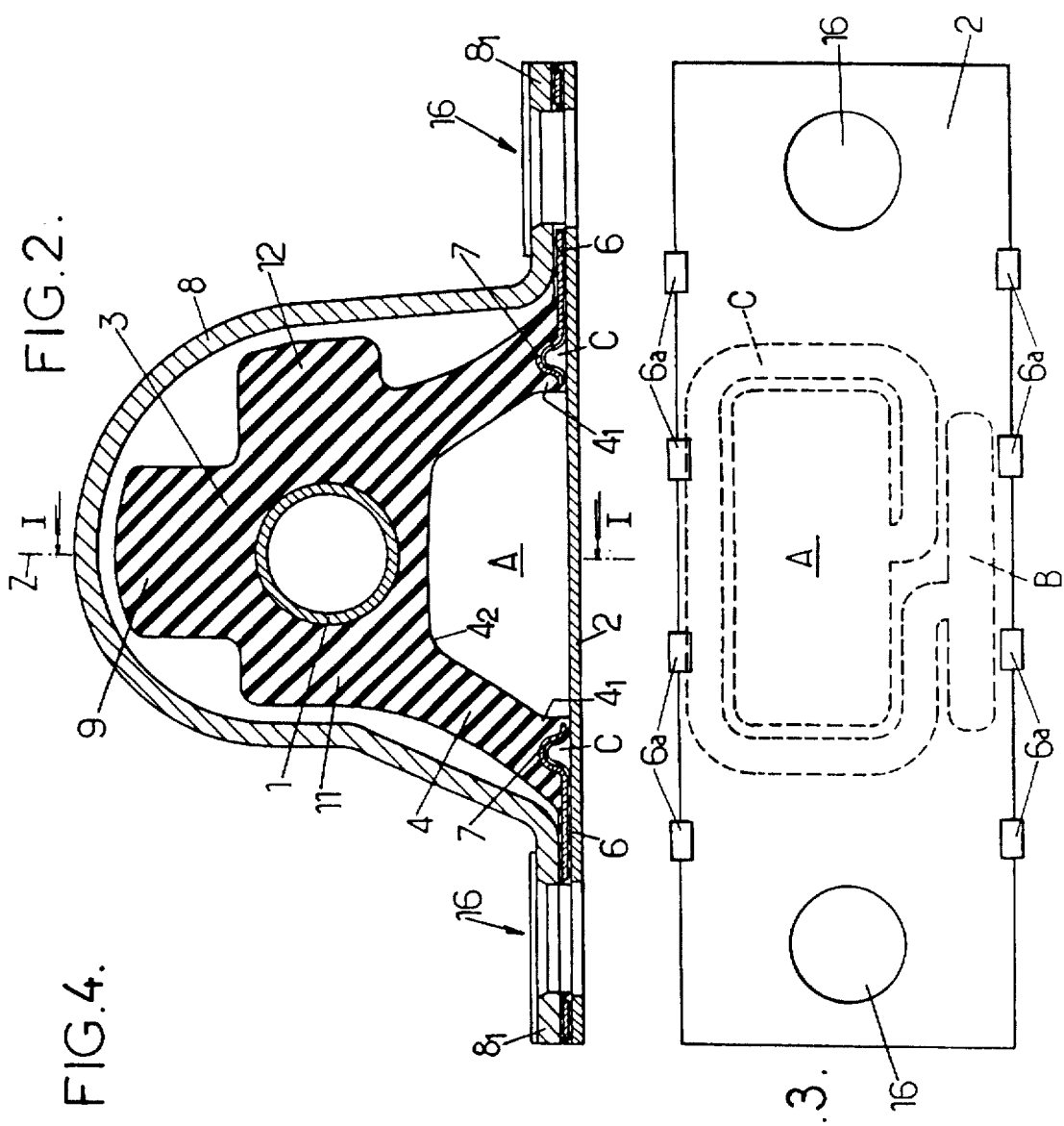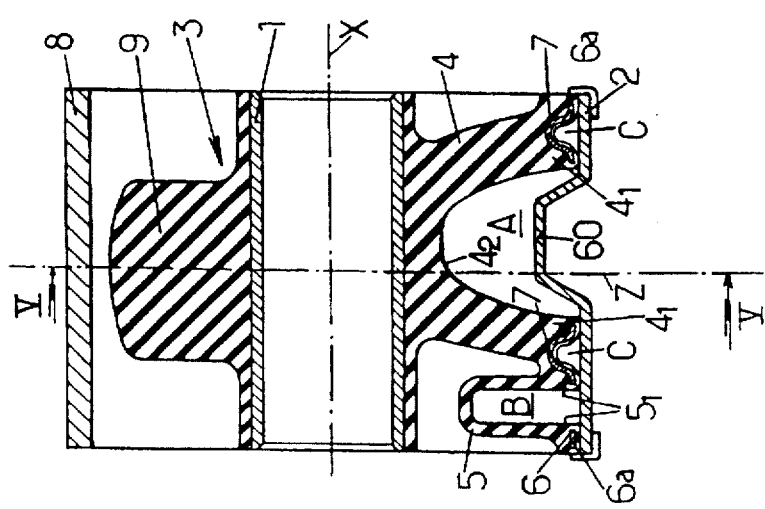

HYDRAULIC ANTIVIBRATION SUPPORTS

The invention relates to antivibration supports designed to be interposed, for damping and connection purposes, between two rigid elements such as the chassis and the engine of a vehicle, to damp vibratory motion between the two rigid elements, essentially along a main vibration direction.

BACKGROUND OF THE INVENTION

More particularly, the invention relates to an antivibration support of the kind in question, comprising:

first and second rigid strength members suitable for being secured to respective ones of the two rigid elements to be united, the second strength member being a base plate which extends in a general plane substantially perpendicular to the main vibration direction;

an elastomer body having a thick wall that connects the two rigid strength members together and that has an inside surface defining part of a working chamber, said thick wall being substantially bell-shaped, extending along the main vibration direction from a peripheral base secured to the second strength member to a crown secured to the first strength member, the elastomer body also including a freely deformable thin elastomer wall which is integrally formed with the thick wall of said elastomer body and which defines part of a compensation chamber in communication with the working chamber via a narrow channel, the two chambers and the narrow channel being filled with a liquid, the base plate having a "support" face secured in sealed manner to the elastomer body to co-operate therewith in defining the two chambers and the narrow channel; and abutment means for limiting relative movement of the first and second strength members towards each other parallel to the main vibration direction in order to avoid completely crushing the working chamber.

Document EP-A-0 236 199 describes an example of such a hydraulic antivibration support.

In that document, the abutment means are constituted by a boss of the elastomer body projecting into the working chamber parallel to the main vibration direction, the boss co-operating with a portion of the second strength member to limit movements of the first strength member towards the second strength member.

The present inventors have discovered that such a boss is liable to disturb proper operation of the antivibration support at high frequency, in particular at around 400 Hz, where the dynamic stiffness of the support becomes too great.

OBJECTS AND SUMMARY OF THE INVENTION

A particular object of the invention is to mitigate that drawback.

To this end, according to the invention, in a hydraulic antivibration support of the kind in question the abutment means do not include any portion that projects into the working chamber from the inside surface of the thick wall of the elastomer body.

In preferred embodiments of the invention, use is made of one or more of the following dispositions:

the first strength member is an elongate member extending along an axis perpendicular to the main vibration direction, the base plate including a zone that is occupied neither by the working chamber nor by the compensation chamber and facing a corresponding zone of the first strength member, and the abutment means include an abutment member which is interposed between said two zones of the base plate and of the first strength member in order to limit movements of the first strength member towards the base plate along the main vibration direction;

the abutment member is an elastomer block belonging to the elastomer body and integrally formed therewith;

the elastomer block is secured to the base plate;

the base plate includes a boss which projects into the working chamber to limit movements of the first strength member towards the base plate along the main vibration direction, said boss thus constituting the above-mentioned abutment means;

the boss is constituted by a stamping formed in the base plate;

the working chamber and the compensation chamber are juxtaposed in non-concentric manner on the support face of the base plate; and the thin wall of elastomer is bell-shaped, extending along the main vibration direction from a peripheral base secured to the base plate to a crown that is free, said thin wall being connected via a portion only of its base to the thick wall of the elastomer body.

BRIEF DESCRIPTION OF THE DRAWINGS

Other characteristics and advantages of the invention appear from the following detailed description of two embodiments given as non-limiting examples and with reference to the accompanying drawings.

In the drawings:

FIG. 2 is a section on line II—II of FIG. 1;

FIG. 3 is a view from beneath of the device shown in FIGS. 1 and 2;

FIG. 4 is a view analogous to FIG. 1 but for another embodiment of the invention.

In the various figures, the same references designate elements that are identical or similar.

MORE DETAILED DESCRIPTION

Figure 1:
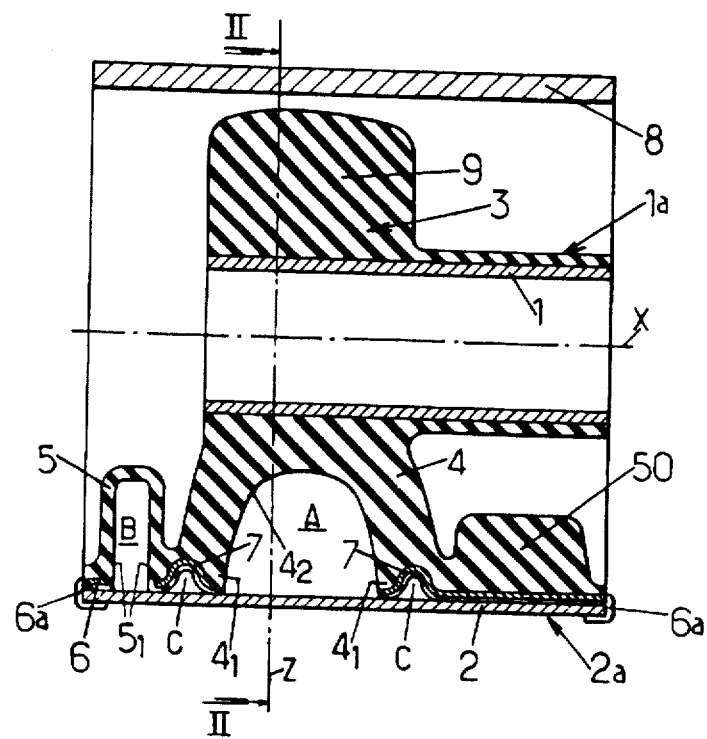
FIG. 1 is a section through a first embodiment of the invention, the section being on line I—I of FIG. 2.

In the first embodiment of the invention, shown in FIGS. 1 to 3, the antivibration support comprises two rigid metal strength members 1 and 2 that are connected together by an elastomer body 3.

The first strength member 1 is tubular in the example shown, having a longitudinal axis X. More generally, the first strength member 1 could be in the form of an elongate member that is solid or hollow, and of section that is circular or otherwise.

The second strength member 2 is a plate referred to below as a base plate, it is generally plane in shape, at least in parts, and it extends parallel to the axis X of the first strength member.

The elastomer body 3 is secured to the first strength member 1 by vulcanization. It has a substantially bell-shaped thick wall 4 which extends along a direction Z (in which vibratory motion between the two strength members is to be damped) from a crown that is secured to the first strength member 1 to a peripheral base $4_1$ secured to the base plate 2. The direction Z is perpendicular to the axis X and to the general plane of the base plate 2, and it may be vertical, for example.

The thick wall 4 has sufficient compression strength to support a static load applied to the first strength member 1 parallel to the axis Z and directed towards the base plate. This load may be greater than 15 kg, for example, and in general is much greater than 15 kg.

The peripheral base $4_1$ of the thick wall 4 is secured in sealed manner to the base plate 2, thereby defining a working chamber A. In the example shown, the chamber A is of rectangular horizontal section, but it could be of some other shape, in particular it could be circular or oval in horizontal section.

The elastomer body 3 also includes a flexible thin wall 5 which is juxtaposed to the thick wall 4 and is integrally formed therewith.

The thin wall 5 is bell-shaped, having a peripheral base $5_1$ which is secured in sealed manner to the base plate 2, thereby defining a compensation chamber B.

The chamber B is rectangular in horizontal section in the example shown, but it could have some other shape.

The walls 4 and 5 preferably do not have any common portion between the chambers A and B, other than the connection via their bases $4_1$ and $5_1$.

The two chambers A and B communicate via a narrow channel C in the form of a groove formed in the face of the elastomer body 3 which is applied against the base plate 2, the edges of the groove being in sealed contact against the base plate 2.

The chambers A and B and the narrow channel C are filled with liquid. When the two strength members 1 and 2 are subjected to relative vibratory motion, the thick wall 4 of the elastomer body deforms, thereby causing the volume of the working chamber A to vary. These variations in volume cause liquid to be transferred between the chambers A and B via the narrow channel C, the variations in volume of the working chamber A being compensated by complementary variations of the compensation chamber B whose thin wall 5 is easily deformable.

In the vicinity of a particular frequency, which is generally less than 20 Hz and which depends essentially on the dimensions of the narrow channel C and on the density of the liquid moving in said narrow channel, a resonance phenomenon occurs in the narrow channel C which, in association with headlosses in said narrow channel, causes a high degree of damping of the vibration between the two strength members 1 and 2.

In the example shown, the elastomer body 3 is molded onto a perforated plate 6 disposed on the face of the elastomer body which is in contact with the base plate 2. Thus, the base plate 2 may be secured to the elastomer body by crimping tabs 6a of the perforated plate 6 onto the base plate 2, or possibly by crimping said base plate onto said perforated plate 6.

The perforated plate 6 includes a groove or gutter 7 which accurately defines the shape of the narrow channel C.

The antivibration support of FIGS. 1 to 3 also includes a metal arch 8 which is rigidly secured to the base plate 2. The arch 8 surrounds the first strength member 1 and the elastomer body 3, and it extends parallel to the axis X.

In the example shown, the arch 8 is a folded plate which covers all of the elastomer body so as to protect it from shocks from foreign bodies. This is advantageous insofar as the thin wall 5 is fragile and exposed beside the thick wall 4.

The arch 8 includes two lateral extensions $8_1$ on respective sides of the elastomer body 3. Each of these lateral extensions covers a portion of the perforated plate 6 which itself overlies the second strength member. In addition, in each of the extensions $8_1$, all three elements are pierced by a respective hole 16.

The holes 16 enable the antivibration support to be secured to a rigid part by means of screws or bolts (not shown), while also providing additional fastening between the various portions of the antivibration support by clamping the extensions $8_1$ onto the plate 6 and the second strength member 2.

To co-operate with the arch 8, the elastomer body 3 includes a first boss 9 which extends parallel to the direction Z from the first strength member 1 and away from the base plate 2. This boss 9 is adapted to come into abutment against the top portion of the arch 8, thereby limiting the displacement of the first strength member going away from the base plate 2.

The elastomer body also has lateral bosses 11 and 12 that are substantially diametrically opposite about the first strength member 1, and that are adapted to come into abutment against the arch 8 whenever the first strength member is moved substantially perpendicularly to the axis X and to the direction Z.

The first strength member 1 also includes a projecting zone 1a and the base plate 2 includes a zone 2a beneath said zone 1a of the first strength member, the zone 2a being occupied neither by the working chamber nor by the compensation chamber.

An elastomer block 50 is placed in this zone 2a of the base plate, which block is preferably integrally formed with the elastomer body 3 and is also preferably secured to the base plate 2, the block 50 being molded over the perforated plate 6.

The elastomer block 50 limits movements of the first strength member 1 towards the base plate 2 parallel to the main vibration direction Z.

This makes it possible to avoid having a boss projecting from the inside surface $4_2$ of the elastomer body where it defines the working chamber A, given that such a boss would reduce the effectiveness of the antivibration support at high frequency, particularly at about 400 Hz.

Figure 5:
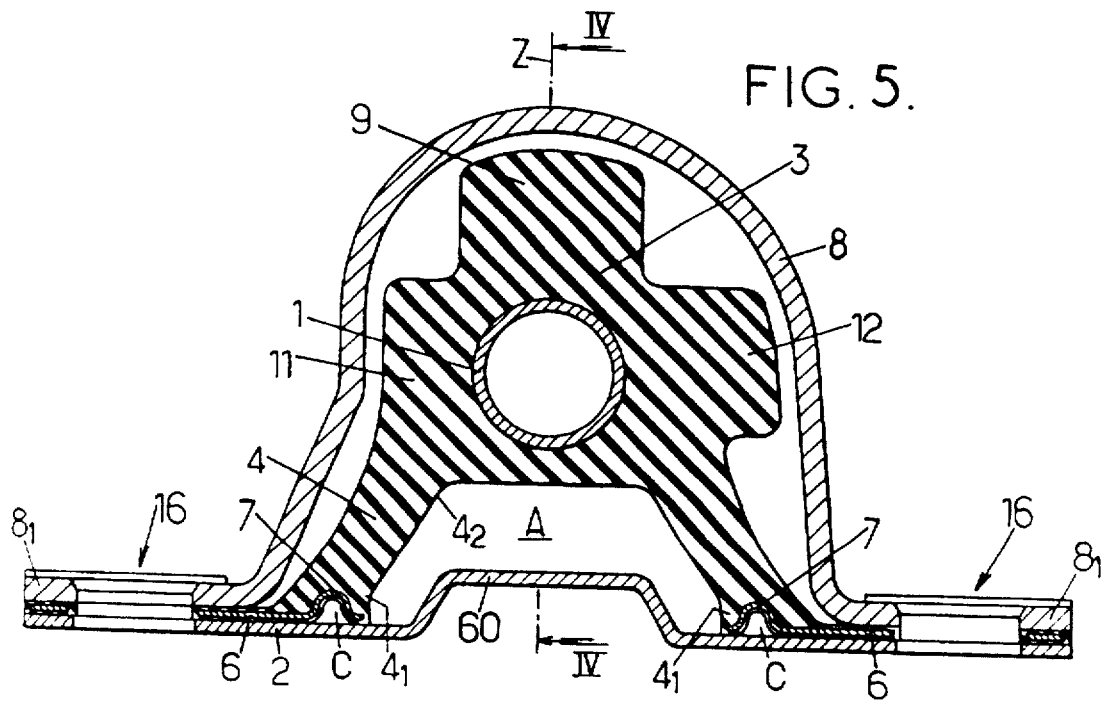
FIG. 5 is a view analogous to FIG. 2 but for the device of FIG. 4.

The variant of FIGS. 4 and 5 is similar to the embodiment of FIGS. 1 and 3. It is therefore not described in detail below, and only the differences between this variant and the embodiment of FIGS. 1 to 3 are explained.

In the variant shown in FIGS. 4 and 5, the device does not have the elastomer block 50, instead the base plate 2 has a boss 60 which may be made by stamping, in particular, and which projects into the working chamber A to limit movements of the first strength member 1 towards the base plate 2 along the main vibration direction Z.

As in the embodiment of FIGS. 1 to 3, this makes it possible to avoid using a boss projecting from the inside surface $4_2$ of the elastomer body that defines the working chamber A, given that such a boss would reduce the effectiveness of the antivibration support at high frequency, in particular in the region of 400 Hz.

We claim:

1. A hydraulic antivibration support for interposing between two rigid elements to damp vibration between the two elements in a main vibration direction, the support comprising:
    first and second strength members suitable for being secured to respective ones of the two rigid elements which are to be united, said first strength member being an elongate member extending along an axis perpendicular to the main vibration direction, and said second strength member being a base plate which extends in a general plane substantially perpendicular to the main vibrations direction, said base plate including a support face;

an elastomer body secured in a sealed manner to said support face of said base plate of said second strength member, said elastomer body having a thick wall that connects the two rigid strength members together, said thick wall
 having an inside surface defining part of a working chamber, said inside surface being free of projections into the working chamber,
 being substantially bell-shaped, and
 extending along the main vibration direction from a peripheral base secured to the second strength member to a crown secured to the first strength member, a freely deformable thin elastomer wall, said thin wall being integrally formed with the thick wall, and defining part of a compensation chamber, and a narrow channel providing communication between the working chamber and the compensation chamber, said narrow channel and both said chambers being filled with a liquid;

an abutment means for limiting relative movement of said first and second strength members towards each other parallel to the main vibration direction in order to avoid completely crushing the working chamber, said abutment means including an elastomer block belonging to the elastomer body and integrally formed therewith, said elastomer block being secured directly to said base plate and being located between a zone of said base plate of said second strength member that is displaced perpendicularly to the main vibration direction from the working chamber and from the compensation chamber and which faces a corresponding zone of said first strength member.

2. A hydraulic antivibration support according to claim 1, in which the working chamber and the compensation chamber are juxtaposed in non-concentric manner on the support face of the base plate.

3. A hydraulic antivibration support according to claim 1, in which the thin wall of elastomer is bell-shaped, extending along the main vibration direction from a peripheral base secured to the base plate to a crown that is free, said thin wall being connected via a portion only of its base to the thick wall of the elastomer body.

* * * * *